Figure 1:
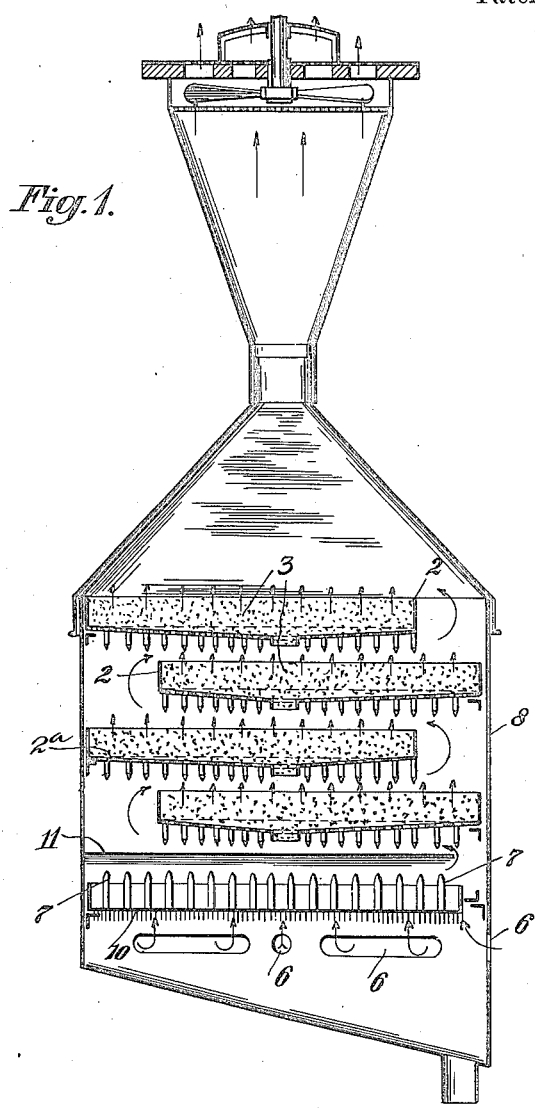

R. P. VAN CALCAR, J. ELLERMAN & H. J. MARTIJN.
APPARATUS FOR DRYING AND STERILIZING AIR.
APPLICATION FILED JAN. 6, 1914.

1,170,469. Patented Feb. 1, 1916.

Inventors
R. P. Valcar,
J. Ellerman,
H. J. Martijn.

By Jno Imirie
Attorney

UNITED STATES PATENT OFFICE.

REINDER PIETERS van CALCAR, OF OEGSTGEEST, AND JAN ELLERMAN AND HENDRIKUS JOHANNES MARTIJN, OF THE HAGUE, NETHERLANDS.

APPARATUS FOR DRYING AND STERILIZING AIR.

1,170,469.   Specification of Letters Patent.   Patented Feb. 1, 1916.

Application filed January 6, 1914. Serial No. 810,637.

*To all whom it may concern:*

Be it known that we, REINDER PIETERS VAN CALCAR, professor, JAN ELLERMAN, banker, and HENDRIKUS JOHANNES MARTIJN, banker, residing the former in the city of Oegstgeest, in the Kingdom of the Netherlands, and the two latter in the city of The Hague, in the Kingdom of the Netherlands, have invented certain new and useful Improvements in Processes for and Apparatus for Drying and Sterilizing Air, of which the following is a specification.

The object of this application consists in further improvements in the subject matter of our U. S. A. Patent No. 1,067,693 relating to means, for drying and sterilizing of air, by means of chemical absorbing agent.

It has been found in practice, that the absorbing capacity of the chemical absorbing agent by the means used hitherto, and described in our foregoing patent has not been adequately utilized; and the present improvement has for its object to provide for a special method of increasing the absorption effect on the chemical absorption agent employed, and of an apparatus for attaining this increased absorption effect.

The same unit quantity of calcium chlorid can be used for absorbing a large quantity of atmospheric moisture if it is employed in a suitable manner. If, when the apparatus described in the before mentioned patent, is employed, a kilogram of calcium chlorid absorbs one liter of atmospheric moisture or more, in accordance with the present improvement one kilogram of calcium chlorid will absorb approximately two and a half liters of atmospheric moisture. This effect is obtained owing to the fact that before the air ascends and reaches the calcium chlorid, and before it passes through or over the same, it has been preliminarily dried. This preliminary drying is obtained in the following manner: The moisture of the ascending atmospheric air dissolves the calcium chlorid arranged in the upper part of the apparatus. The liquid thus caused to drop is collected in the lower part of the apparatus, and absorbed by porous bodies or substances. These porous bodies or substances are arranged in such a manner that before the atmospheric air admitted ascends to the troughs filled with calcium chlorid, it must necessarily pass over the said bodies. These bodies having absorbed the calcium chlorid solution which is still capable of absorbing atmospheric moisture the quantity of calcium chlorid absorbed by the porous bodies or substances is utilized for preliminarily drying the air continuously conducted into the apparatus, so that only preliminarily dried air which has been freed from the greater part of its moisture, passes to the upper trough filled with calcium chlorid. By this means, the result attained, is that the quantity of calcium chlorid contained in the upper part of the apparatus has no longer to eliminate the whole of the atmospheric moisture, but is only employed for effecting the subsequent drying, and by this means, the method is rendered far more economical.

In order to attain the result described a trough with a solid bottom is arranged in the lower part of the apparatus and from this bottom, pins or protuberances of a certain length project in the upward direction. These projecting bodies such as pins or the like, are incased in porous substances such as cotton wool, sponge, felt or the like, and act as baffles for the air which is caused to circulate around and over them. The perforated troughs arranged in the upper part of the apparatus, and filled with calcium chlorid can be provided with pins or other baffles extending downward from their bottom faces and down which the calcium chlorid employed for the final drying is able to trickle, whereby the preliminary drying of the air already preliminarily dried on the lower trough, is still further increased.

Figure 2:
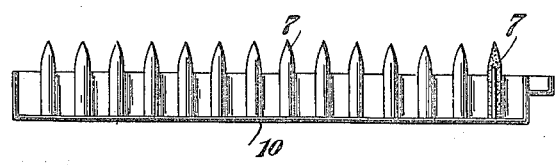
Figure 3:
Figure 4:
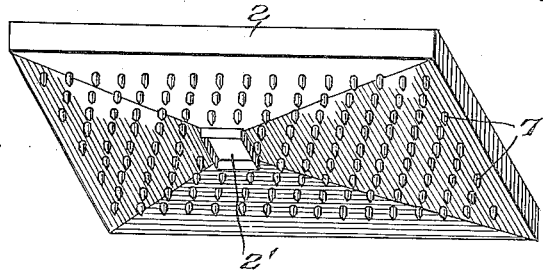
Figure 5:
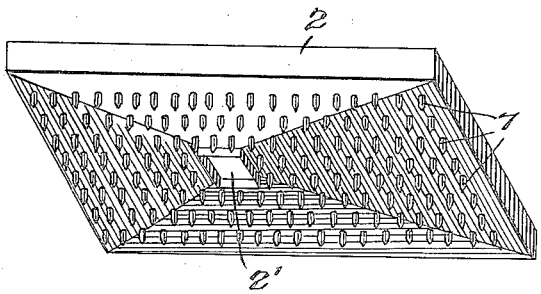
Figure 6:
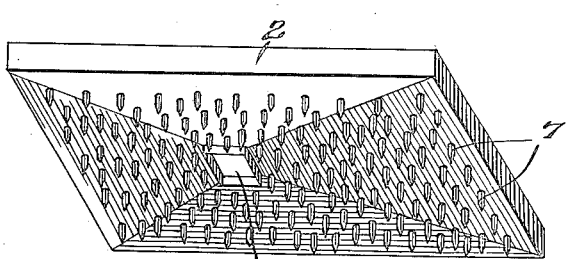
Figure 7:
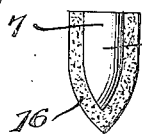
Figure 8:
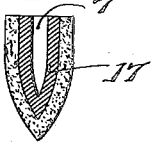
Figure 9:
Figure 10:
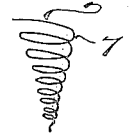
Figure 11:
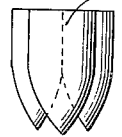
Figure 12:
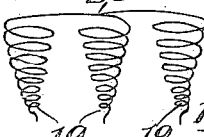

The apparatus is illustrated in Figure 1 which shows the apparatus in vertical section, Fig. 2 showing the lowest trough in section with the incased pins, and Fig. 3 is a view partly in section showing one of the pins and its enveloping cover on an enlarged scale. Fig. 4 is a perspective view showing the underside of a pan having depending staggered pins. Fig. 5 is a view similar to Fig. 4 with the pins arranged in parallel rows both longitudinally and transversely of the pan. Fig. 6 is a view similar to Figs. 4 and 5, but showing the pins arranged in concentric circles about the center of the pan. Fig. 7 is a view showing the body of a modified form of pin with its absorbent envelop being solid. Fig. 8 is a view similar to Fig. 7 but showing a hollow pin. Fig. 9 is a modified form of pin suitable for the lower pan and formed of a spiral coil of wire. Fig. 10 is a modification similar to Fig. 9 but suitable for the upper pans or troughs. Fig. 11 is an illustration showing a compound pin formed of a number of pins looped together, the pins being of the type shown in Fig. 7. Fig. 12 is a view showing a group of pins, the individual pins being similar to Fig. 10.

The general form of the invention is similar to that disclosed in the patent hereinbefore referred to, and in the construction shown there is provided a casing 8 near the bottom of which are air admission apertures 6. Suitably supported near these air admission apertures is a trough or pan 10 having a solid bottom. Above this trough or pan is a beveled plate 11 and between this beveled plate and the top of the apparatus are a series of pans or troughs 2, each provided on its bottom with a central opening 2' and being charged with calcium chlorid as indicated at 3. Projecting upward from the pan 10 and downward from the bottoms of the pans 2 are circuit pins which are indicated in general at 7. In the form shown in Fig. 3 each of these pins is provided with a cylindrical core 12 surrounded by an absorbent envelop 13 preferably having an ogival head 14. In the form shown in Fig. 7 the body of the pin is ogival as indicated at 15 and is surrounded with a layer of absorbent material 16 of a uniform thickness so that this layer is also provided with an ogival point. In the form shown in Fig. 8 there is provided a hollow ogival body 17 surrounded by an ogival envelop 18. In the form shown in Figs. 9 and 10 the pin merely consists of a spirally wound length of wire 19, Fig. 9 showing the apex of the spiral directed upwardly and Fig. 10 showing the spiral with its apex directed downwardly. In the form shown in Fig. 11 the same type of pin is employed as that shown in Fig. 7, but these pins are grouped together in threes as clearly shown in said figure. In the form shown in Fig. 12 the different spirals, such as illustrated in Fig. 10, are connected as at 20. Any one of these forms may be arranged either on the trough 10 or the troughs 2, and these arrangements may take the staggered formation shown in Fig. 4, the parallel rectangular formation shown in Fig. 5, or the parallel circular formation shown in Fig. 6.

It is to be understood that all of the pans 2 are provided with perforations 2ª in their bottoms, as clearly shown in Fig. 1.

What we claim is:

1. An apparatus for drying and sterilizing air consisting of a casing having inlet means at the bottom and outlet means at the top, pans held in said casing and provided with foraminated bottoms, said pans being adapted to contain a drying and sterilizing chemical, and pins projecting from the bottoms of said pans and arranged to afford contact surfaces for the air flowing through the apparatus.

2. An apparatus for drying and sterilizing air consisting of a casing having inlet means at the bottom and outlet means at the top, pans held in said casing and provided with foraminated bottoms, said pans being adapted to contain a drying and sterilizing chemical, and pins projecting from the bottoms of said pans and arranged to afford contact surfaces for the air flowing through the apparatus, said pins being provided each with an absorbent envelop.

3. An apparatus for drying and sterilizing air comprising a casing having inlet and outlet openings, pans having foraminated bottoms held in said casing in superposed staggered relation, and baffle pins projecting downward from the bottoms of said pans.

4. An apparatus for drying and sterilizing air comprising a casing having inlet and outlet openings, pans having foraminated bottoms held in said casing in superposed staggered relation, and baffle pins projecting downward from the bottoms of said pans, each of said pins being provided with an absorbent coating and each of said pans being adapted to contain a suitable soluble absorbent material.

In testimony whereof we affix our signatures in presence of two witnesses.

REINDER PIETERS van CALCAR.
JAN ELLERMAN.
HENDRIKUS JOHANNES MARTIJN.

Witnesses:
 JAC. J. G. WALLE,
 J. D. MOK.